US012021316B2

(12) United States Patent
Jian et al.

(10) Patent No.: US 12,021,316 B2
(45) Date of Patent: Jun. 25, 2024

(54) ANTENNA UNIT AND TERMINAL DEVICE

(71) Applicant: VIVO MOBILE COMMUNICATION CO., LTD., Guangdong (CN)

(72) Inventors: Xianjing Jian, Chang'an Dongguan (CN); Huan-Chu Huang, Chang'an Dongguan (CN); Yijin Wang, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 284 days.

(21) Appl. No.: 17/531,742

(22) Filed: Nov. 20, 2021

(65) Prior Publication Data

US 2022/0085501 A1 Mar. 17, 2022

Related U.S. Application Data

(63) Continuation of application No. PCT/CN2020/090102, filed on May 13, 2020.

(30) Foreign Application Priority Data

May 22, 2019 (CN) ......................... 201910430964.2

(51) Int. Cl.
*H01Q 5/371* (2015.01)
*H01Q 5/50* (2015.01)
*H01Q 9/04* (2006.01)

(52) U.S. Cl.
CPC ............... *H01Q 5/371* (2015.01); *H01Q 5/50* (2015.01); *H01Q 9/0407* (2013.01)

(58) Field of Classification Search
CPC ........ H01Q 1/22; H01Q 1/2258; H01Q 1/242; H01Q 1/36; H01Q 1/44; H01Q 1/50;
(Continued)

(56) References Cited

U.S. PATENT DOCUMENTS 8,319,692 B2 11/2012 Chiang et al.
11,545,734 B2 * 1/2023 An ....................... H01Q 9/0407
(Continued)

FOREIGN PATENT DOCUMENTS

CN 101740870 A 6/2010
CN 103904414 A 7/2014
(Continued)

OTHER PUBLICATIONS

JP Office Action in Application No. 2021-567041 Dated Dec. 19, 2022.
(Continued)

*Primary Examiner* — Raymond R Chai
(74) *Attorney, Agent, or Firm* — Price Heneveld LLP

(57) ABSTRACT

An antenna unit and a terminal device are provided. The antenna unit includes a target metal groove, M feed portions arranged at the bottom of the target metal groove, M coupling bodies and a first insulator which are arranged in the target metal groove, and at least two radiating bodies borne by the first insulator, wherein the M feed portions are insulated from the target metal groove, the M coupling bodies are located between the bottom of the target metal groove and the first insulator, each of the M feed portions is electrically connected to one coupling body respectively, each of the M coupling bodies is coupled with the at least two radiating bodies and the target metal groove, different radiating bodies have different resonance frequencies, and M is a positive integer.

16 Claims, 11 Drawing Sheets

(58) Field of Classification Search

CPC ............ H01Q 5/10; H01Q 5/20; H01Q 5/307; H01Q 5/35; H01Q 5/371; H01Q 5/50; G01Q 9/0407; G01Q 9/0457

See application file for complete search history.

(56) References Cited

U.S. PATENT DOCUMENTS

| | | | | |
|---|---|---|---|---|
| 2004/0150575 A1 | 8/2004 | Lizalek et al. | | |
| 2007/0080864 A1 | 4/2007 | Channabasappa | | |
| 2008/0278381 A1 | 11/2008 | Lai et al. | | |
| 2010/0134378 A1* | 6/2010 | Duchesne | H01Q 9/0464 | 343/872 |
| 2014/0176378 A1 | 6/2014 | Yu et al. | | |
| 2015/0130682 A1* | 5/2015 | Jung | H01Q 1/525 | 343/895 |
| 2018/0013209 A1* | 1/2018 | Hung | H01Q 21/28 | |
| 2020/0313282 A1* | 10/2020 | Jia | H01Q 5/378 | |
| 2021/0218155 A1 | 7/2021 | Huang et al. | | |

FOREIGN PATENT DOCUMENTS

| | | | |
|---|---|---|---|
| CN | 203983480 | U | 12/2014 |
| CN | 105990651 | A | 10/2016 |
| CN | 106450748 | A | 2/2017 |
| CN | 2018400424 | A | 8/2018 |
| CN | 109037906 | A | 12/2018 |
| CN | 109066055 | A | 12/2018 |
| CN | 109119757 | A | 1/2019 |
| CN | 110212283 | A | 9/2019 |
| EP | 1744399 | A1 | 1/2007 |
| JP | 2010220047 | A | 9/2010 |
| KR | 10-2008-0039901 | A | 5/2008 |
| WO | 2007060782 | A1 | 5/2007 |
| WO | 2019076928 | A1 | 4/2019 |

OTHER PUBLICATIONS

KR Office Action dated Apr. 5, 2023 as received in Application No. 10-2021-7038168.

European Search Report in Application No. 20809128.0 Dated Jun. 20, 2022.

"Design of Dual-Polarized L-Probe Patch Antenna Arrays With High Isolation" IEEE Transactions on Antennas and Propagation, vol. 52, No. 1, Hang et al., XP-001046269, Jan. 2004.

Guo et al., 60-GHz LTCC Antenna Arrays, Dept. of Electrical and Computer Engineering, National University of Singapore, 2014.

Sruth, et al, Design of a Dual-Polarized Antenna Using Square Backed Cavity, 2017 International Conference on Innovations in Information, Embedded and Communication Systems (ICIIECS), Feb. 1, 2018.

International Search Report and Written Opinion issued in corresponding application No. PCT/CN2020/090102, dated Aug. 12, 2020.

Chinese First Office Action issued in corresponding application No. 201910430964.2, dated Aug. 5, 2020.

Chinese Second Office Action issued in corresponding application No. 201910430964.2, dated Dec. 15, 2020.

* cited by examiner

ANTENNA UNIT AND TERMINAL DEVICE

CROSS-REFERENCE TO RELATED APPLICATION

This application is a continuation application of International Application No. PCT/CN2020/090102 filed on May 13, 2020, which claims priority to Chinese Patent Application No. 201910430964.2, filed with the China National Intellectual Property Administration on May 22, 2019, and entitled "ANTENNA UNIT AND TERMINAL DEVICE", which are incorporated herein by reference in their entirety.

TECHNICAL FIELD

Embodiments of the present disclosure relate to the technical field of communications, and in particular, to an antenna unit and a terminal device.

BACKGROUND

With the development of the 5-generation communication (5G) system and the wide application of the terminal device, millimeter wave antennae are gradually applied to various terminal devices to meet the increasing demands of users.

At present, the millimeter wave antenna in the terminal device is mainly implemented by an antenna in package (AIP) technology. For example, as shown in FIG. 1, an array antenna 11 with a working wavelength being millimeter wave, a radio frequency integrated circuit (RFIC) 12, a power management integrated circuit (PMIC) 13 and a connector 14 are packaged into a module 10 through the AIP technology, and the module 10 may be called a millimeter wave antenna module. The antenna in the above array antenna may be a patch antenna, a Yagi-Uda antenna or a dipole antenna.

However, the antenna in the array antenna is generally narrowband antenna (such as the path antenna listed above), so the coverage frequency band of each antenna is limited, but there are usually many millimeter wave frequency bands planned in the 5G system, such as an n257 (26.5-29.5 GHz) frequency band dominated by 28 GHz and an n260 (37.0-40.0 GHz) frequency band dominated by 39 GHz. Therefore, the traditional millimeter wave antenna module may not completely cover the mainstream millimeter wave frequency bands planned in the 5G system, resulting in poor antenna performance of the terminal device.

SUMMARY

Embodiments unit the present disclosure provide an antenna unit and a terminal device.

According to a first aspect, an embodiment of the present disclosure provides an antenna unit. The antenna unit includes a target metal groove, M feed portions arranged at the bottom of the target metal groove, M coupling bodies and a first insulator which are arranged in the target metal groove, and at least two radiating bodies borne by the first insulator, wherein the M feed portions are insulated from the target metal groove, the M coupling bodies are located between the bottom of the target metal groove and the first insulator, each of the M feed portions is electrically connected to one coupling body respectively, each of the M coupling bodies is coupled with the at least two radiating bodies and the target metal groove, different radiating bodies have different resonance frequencies, and M is a positive integer.

According to a second aspect, an embodiment of the present disclosure provides a terminal device. The terminal device includes the antenna unit in the first aspect.

In the embodiment of the present disclosure, the antenna unit may include a target metal groove, M feed portions arranged at the bottom of the target metal groove, M coupling bodies and a first insulator which are arranged in the target metal groove, and at least two radiating bodies borne by the first insulator, wherein the M feed portions are insulated from the target metal groove, the M coupling bodies are located between the bottom of the target metal groove and the first insulator, each of the M feed portions is electrically connected to one coupling body respectively, each of the M coupling bodies is coupled with the at least two radiating bodies and the target metal groove, different radiating bodies have different resonance frequencies, and M is a positive integer. By the solution, since the coupling bodies are coupled with the at least two radiating bodies and the target metal groove (may also serve as a radiating body), the coupling bodies may be coupled with the at least two radiating bodies and the target metal groove in a case that the coupling bodies receive an alternating current signal, so that the at least two radiating bodies and the target metal groove generate induced alternating current signals, and the at least two radiating bodies and the target metal groove generate electromagnetic wave with a certain frequency. Moreover, since different radiating bodies have different resonance frequencies, the electromagnetic waves generated by at least two radiating bodies and the target metal groove have different frequencies, so that the antenna unit can cover different frequency bands, that is, the frequency bands covered by the antenna unit can be increased, and the antenna performance of the antenna unit can be improved.

Figure 1:
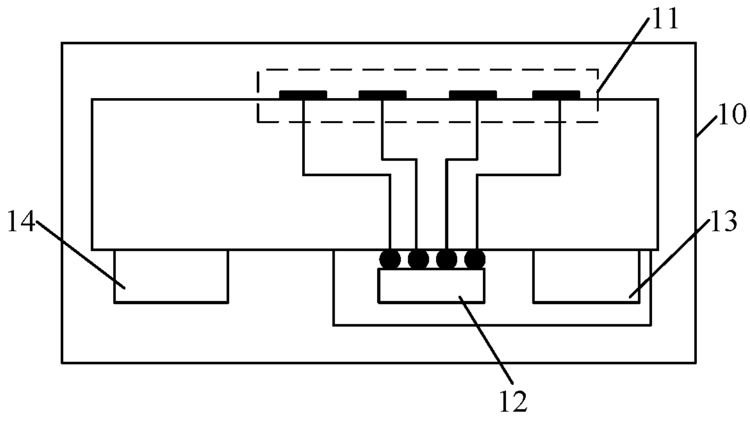
FIG. 1 is a structural schematic diagram of an traditional millimeter-wave antenna according to an embodiment of the present disclosure.

Description of reference numerals: 10—millimeter wave antenna module; 11—array antenna with a working wavelength being millimeter wave; 12—RFIC; 13—PMIC; 14—connector; 20—antenna unit; 201—target metal groove; 201*a*—first metal groove; 201*b*—second metal groove; 202—feed portion; 2020—first end of feed portion; 2021—second end of feed portion; 203—coupling body; 204—first insulator; 205—at least two radiating bodies; 2050—first radiating body; 2051—second radiating body; 206—second insulator; 207—metal protrusion; 208—through hole; S1—first plane; L1—first symmetry axis; L2—second symmetry axis; 3—terminal device; 30—shell; 31—first metal frame; 32—second metal frame; 33—third metal frame; 34—fourth metal frame; 35—floor; 36—first antenna; 37—first groove.

It should be noted that in the embodiments of the present disclosure, coordinate axes in the coordinate system shown in the drawings are mutually orthogonal.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, the first metal groove and the second metal groove are used to distinguish between different metal grooves, but are not used to describe a particular sequence of the metal grooves.

In the embodiments of the present disclosure, the word such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the description of the embodiments of the present disclosure, unless otherwise stated, "a plurality of" means two or more, for example, a plurality of antennae means two or more antennae.

The following describes some terms/nouns used in the embodiments of the present disclosure.

Coupling refers to close cooperation and mutual influence between input and output of two or more circuit elements or electric networks, and energy may be transmitted from one side to the other side through interaction.

Alternating current signal refers to a signal of which the current direction will change.

Perpendicular polarization means that an electric field intensity direction formed during antenna radiation is perpendicular to the ground plane.

Horizontal polarization means that an electric field intensity direction formed during antenna radiation is parallel to the ground plane.

Multiple-input multiple-output (MIMO) technology refers to a technology that uses a plurality of antennae to transmit or receive signals at a transmission end (that is, a transmitting end and a receiving end) to improve the communication quality. In the technology, the signal may be transmitted or received by the plurality of antennae at the transmission end.

Relative dielectric constant refers to a physical parameter for representing the dielectric or polarization property of a dielectric material.

Floor refers to a part of the terminal device that may serve as a virtual ground, such as a printed circuit board (PCB) or a display screen of the terminal device.

The embodiments of the present disclosure provide an antenna unit and a terminal device. The antenna unit may include a target metal groove, M feed portions arranged at the bottom of the target metal groove, M coupling bodies and a first insulator which are arranged in the target metal groove, and at least two radiating bodies borne by the first insulator, wherein the M feed portions are insulated from the target metal groove, the M coupling bodies are located between the bottom of the target metal groove and the first insulator, each of the M feed portions is electrically connected to one coupling body respectively, each of the M coupling bodies is coupled with the at least two radiating bodies and the target metal groove, different radiating bodies have different resonance frequencies, and M is a positive integer. By the solution, since the coupling bodies are coupled with the at least two radiating bodies and the target metal groove (may also serve as a radiating body), the coupling bodies may be coupled with the at least two radiating bodies and the target metal groove in a case that the coupling bodies receive an alternating current signal, so that the at least two radiating bodies and the target metal groove generate induced alternating current signals, and the at least two radiating bodies and the target metal groove generate electromagnetic wave with a certain frequency. Moreover, since different radiating bodies have different resonance frequencies, the electromagnetic waves generated by at least two radiating bodies and the target metal groove have different frequencies, so that the antenna unit can cover different frequency bands, that is, the frequency bands covered by the antenna unit can be increased, and the performance of the antenna unit can be improved.

The antenna unit provided in the embodiments of the present disclosure may be applied to the terminal device, or may also be applied to other electronic devices that need to use the antenna unit. This may be specifically determined according to an actual usage requirement, and is not limited in the embodiments of the present disclosure. The following uses an example in which the antenna unit is applied to the terminal device, to provide exemplary description of the antenna unit provided in the embodiments of the present antenna.

The following exemplarily describes the antenna unit provided in the embodiments of the present disclosure with reference to the accompanying drawings.

Figure 2:
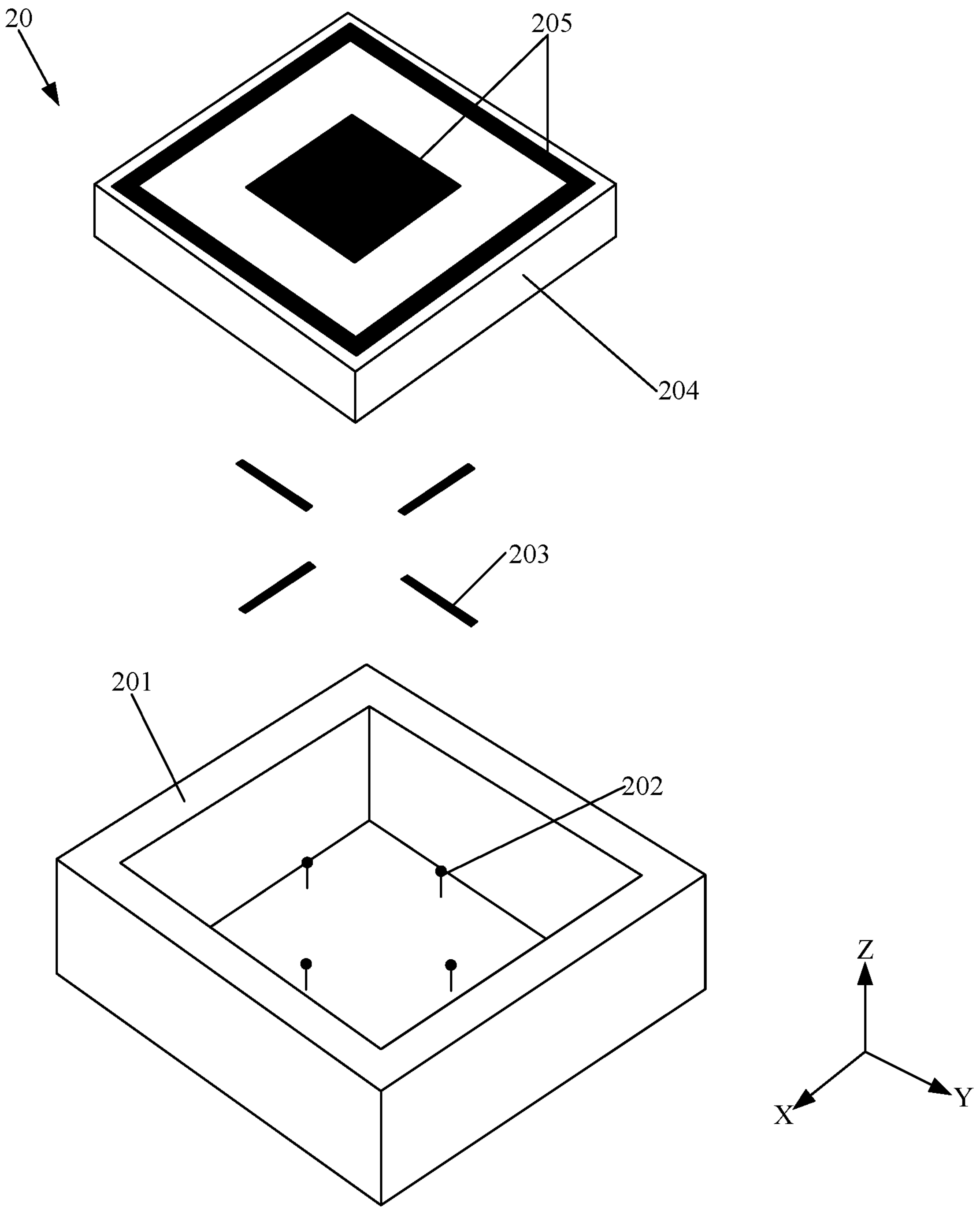
FIG. 2 is a first exploded view of an antenna unit according to an embodiment of the present disclosure.

As shown in FIG. 2, it is a schematic exploded view of a structure of an antenna unit according to an embodiment of the present disclosure. The antenna unit 20 may include a target metal groove 201, M feed portions 202 arranged at the bottom of the target metal groove 201, M coupling bodies 203 and a first insulator 204 which are arranged in the target metal groove 201, and at least two radiating bodies 205 borne by the first insulator 204, wherein the M feed portions 202 may be insulated from the target metal groove 201, the M coupling bodies 203 may be located between the bottom of the target metal groove 201 and the first insulator 204, each feed portion 202 of the M feed portions 202 may be electrically connected to one coupling body 203 respectively, each coupling body 203 of the M coupling bodies may be coupled with the at least two radiating bodies 205 and the target metal groove 201, different radiating bodies have different resonance frequencies, and M is a positive integer.

It may be understood that the target metal groove may also serve as a radiating body in the antenna provided in the embodiments of the present disclosure.

In the embodiments of the present disclosure, that the M coupling bodies are coupled with the target metal groove may be: the M coupling bodies are coupled with the bottom of the target metal groove.

It should be noted that in the embodiments of the present disclosure, in order to indicate the structure of the antenna unit more clearly, FIG. 2 is indicated by an exploded view of the antenna unit, that is, it is indicated by that components of the antenna unit are all in a separated state. In actual implementation, the M coupling bodies, the first insulator and the at least two radiating bodies are all arranged in the target metal groove, that is, the target metal groove, the M coupling bodies, the first insulator and the at least two radiating bodies form a whole body to form an antenna unit provided by the embodiments of the present disclosure.

In addition, in FIG. 2, the feed portion 202 and the coupling body 203 are not shown in an electrically connected state. In actual implementation, the feed portion 202 may be electrically connected to the coupling body 203.

In order to describe the antenna unit and the working principle thereof provided in the embodiments of the present disclosure more clearly, the working principle of transmitting and receiving signals of the antenna unit provided by the embodiments of the present disclosure will be exemplarily described below by specifically taking one antenna unit as an example.

Exemplarily, with reference to FIG. 2, in the embodiments of the present disclosure, when the terminal device transmits a 5G millimeter wave signal, a signal source in the terminal device will send out an alternating current signal, and the alternating current signal may be transmitted to the coupling body through the feed portion. Then after the coupling body receives the alternating current signal, on one hand, the coupling body may be coupled with the at least two radiating bodies, so that the at least two radiating bodies generate induced alternating current signals, and then the at least two radiating bodies may radiate electromagnetic wave with a certain frequency outwards (such as an opening direction of the target metal groove); and on the other hand, the coupling body may also be coupled with the target metal groove (specifically may be the bottom of the target metal groove), so that the target metal groove generates an induced alternating current signal, and then the target metal groove may radiate electromagnetic wave with a certain frequency outwards (the target metal groove and the at least two radiating bodies have different resonance frequencies, so the frequency of the electromagnetic wave radiated outwards by the target metal groove is different from the frequency of the electromagnetic wave radiated outwards by the at least two radiating bodies). In this way, the terminal device may transmit signals through the antenna unit provided by the embodiments of the present disclosure.

Further exemplarily, in the embodiments of the present disclosure, when the terminal device receives a 5G millimeter wave signal, electromagnetic wave in a space where the terminal device is located may excite the at least two radiating bodies and the target metal groove, so that the at least two radiating bodies and the target metal groove generate induced alternating current signals. After the at least two radiating bodies and the target metal groove generate the induced alternating current signals, the at least two radiating bodies and the target metal groove may be coupled with the coupling body respectively, so that the coupling body generates an induced alternating current signal. Then, the coupling body may input the alternating current signal to a receiver in the terminal device through the feed portion, so that the terminal device can receive 5G millimeter wave signals transmitted by other devices. That is, the terminal device may receive signals through the antenna unit provided by the embodiments of the present disclosure.

The embodiments of the present disclosure provide an antenna unit. Since the coupling bodies are coupled with the at least two radiating bodies and the target metal groove (may also serve as a radiating body), the coupling bodies may be coupled with the at least two radiating bodies and the target metal groove in a case that the coupling bodies receive an alternating current signal, so that the at least two radiating bodies and the target metal groove generate induced alternating current signals, and the at least two radiating bodies and the target metal groove generate electromagnetic wave with a certain frequency. Moreover, since different radiating bodies have different resonance frequencies, the electromagnetic waves generated by at least two radiating bodies and the target metal groove have different frequencies, so that the antenna unit can cover different frequency bands, that is, the frequency bands covered by the antenna unit can be increased, and the performance of the antenna unit can be improved.

Figure 3:
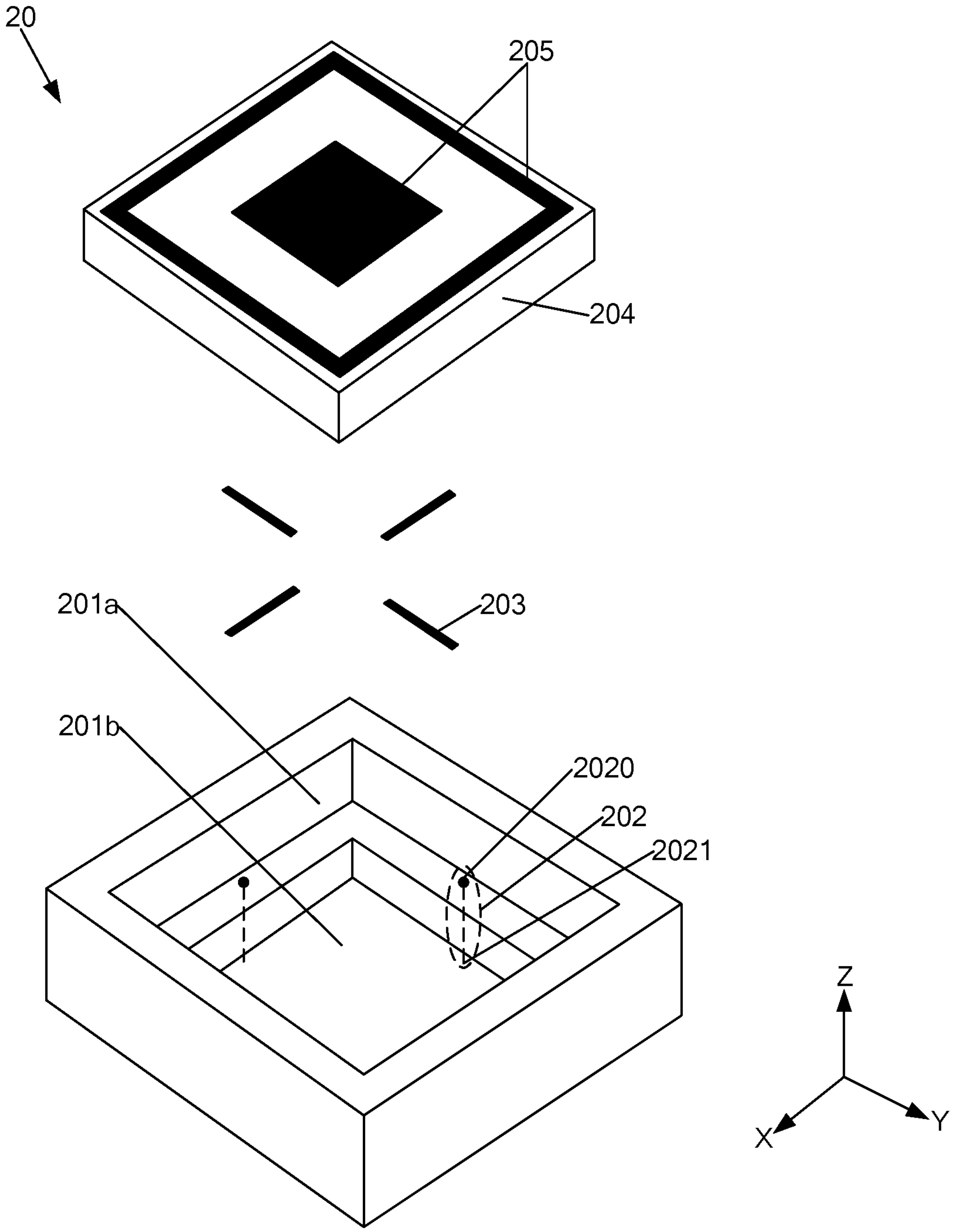
FIG. 3 is a second exploded view of an antenna unit according to an embodiment of the present disclosure.

Optionally, in the embodiments of the present disclosure, with reference to FIG. 2, as shown in FIG. 3, the target metal groove may include a first metal groove 201*a* and a second metal groove 201*b* arranged at the bottom of the first metal groove 201*a*.

The M feed portions 202 may be arranged at the bottom of the first metal groove 201*a*, the M coupling bodies 203 and the first insulator 204 may be arranged in first metal groove 201*a*, and each coupling body 203 of the M coupling bodies may be coupled with the at least two radiating bodies 205 and the second metal groove 201*b*.

In the embodiment of the present disclosure, the target metal groove is set to be two metal grooves, namely the first metal groove and the second metal groove, the M feed portions are arranged at the bottom of the first metal groove, the first insulator and the M coupling bodies are arranged in the first metal groove, and the M coupling bodies are coupled with the second metal groove, so that the two metal grooves can perform different functions in the antenna unit, and interference among various parts in the antenna unit can be reduced, for example, the interference caused by parts arranged in the first metal groove in the coupling process of the second metal groove and the M coupling bodies can be reduced.

Optionally, in the embodiments of the present disclosure, an opening of the first metal groove is larger than an opening of the second metal groove. That is, the opening area of the first metal groove is larger than the opening area of the second metal groove.

In the embodiments of the present disclosure, as shown in FIG. 3, in a direction indicated by a Z axis, the second metal groove 201*b* is arranged at the bottom of the first metal groove 201*a*, and the opening area of the first metal groove 201*a* is equal to bottom area of the first metal groove 201*a*, so the opening of the first metal groove 201*a* may be larger than the opening of the second metal groove 201*b*, and the second metal groove 201*b* may not be blocked by the first metal groove 201*a*.

Certainly, in actual implementation, the opening of the first metal groove may also be smaller than or equal to the opening of the second metal groove, which may be specifically determined according to an actual use requirement and is not limited in the embodiments of the present disclosure.

In the embodiments of the present disclosure, the second metal groove is arranged at the bottom of the first metal groove, and the opening of the second metal groove is smaller than the opening of the first metal groove, so the manufacturing process of the antenna unit can be simplified.

Optionally, in the embodiments of the present disclosure, both the first metal groove and the second metal groove may be rectangular grooves. Specifically, both the first metal groove and the second metal groove may be square grooves.

Optionally, in the embodiments of the present disclosure, a shape of the opening of the first metal groove may be as same as a shape of the opening of the second metal groove, or may also be different from the shape of the opening of the second metal groove. Specifically, this may be determined based on an actual use requirement, and is not limited in the embodiments of the present disclosure.

Exemplarily, as shown in FIG. 3, the opening shapes of the first metal groove 201*a* and the second metal groove 201*b* may be square.

Certainly, in actual implementation, the opening shaped of the first metal groove and the opening shape of the second metal groove may be any possible shapes, which may be determined according to an actual use requirement and is not limited in the embodiments of the present disclosure.

Optionally, in the embodiments of the present disclosure, as shown in FIG. 3, the M feed portions 202 may be arranged at the bottom of the first metal groove 201*a* and penetrate through the bottom of the first metal groove 201*a*.

It should be noted that in the embodiments of the present disclosure, the feed portion is arranged at the bottom of the first metal groove and penetrates through the bottom of the first metal groove, so a part of the feed portion 202 in FIG. 3 penetrating through the bottom of the first metal groove 201*a* is indicated by a dotted line.

Specifically, in actual implementation, as shown in FIG. 3, in the embodiments of the present disclosure, a first end 2020 of the feed portion 202 may be in contact with the coupling body 203, and a second end 2021 of the feed portion 202 may be connected to one signal source (such as a 5G signal source in the terminal device) in the terminal device. In this way, the alternating current signal transmitted by the signal source in the terminal device may be transmitted to the coupling body through the feed portion, and then the coupling body may be coupled with the at least two radiating bodies and the second metal groove, so that the at least two radiating bodies and the second metal groove generate induced alternating current signals, the at least two radiating bodies and the second metal groove an generate electromagnetic waves, and the antenna unit provided by the embodiments of the present disclosure may radiate the 5G millimeter wave signal in the terminal device outwards.

In the embodiments of the present disclosure, the terminal device may transmit the alternating current signal to the coupling body through the feed portion, and the coupling body may transmit the alternating current signal to the terminal device through the feed portion, so the feed portion may be arranged at the bottom of the first metal groove and penetrate through the bottom of the first metal groove, and the feed portion is connected to the signal source in the terminal device.

Optionally, in the embodiments of the present disclosure, each of the M coupling bodies may be a metal sheet. Exemplarily, each of the M coupling bodies may be a copper sheet.

Optionally, in the embodiments of the present disclosure, the M coupling bodies may be of a rectangular shape and any possible shapes.

Certainly, in actual implementation, the M coupling bodies may also be made of any other possible materials or be of any other possible shapes, which may be specifically determined according to an actual use requirement and is not limited in the embodiments of the present disclosure.

Optionally, in the embodiments of the present disclosure, the M coupling bodies may be four coupling bodies (that is, M=4). The four coupling bodies may form two coupling body groups. Each coupling body group may include two coupling bodies which are arranged symmetrically, and a symmetry axis of one coupling body group is orthogonal to a symmetry axis of the other coupling body group.

A signal source connected to a first feed portion and a signal source connected to a second feed portion have the same amplitude and a phase difference of 180 degrees, and the first feed portion and the second feed portion are feed portions which are electrically connected to two coupling bodies in the same coupling body group respectively.

In the embodiments of the present disclosure, the antenna unit may include two coupling body groups, so the terminal device may transmit or receive signals respectively through the two coupling body groups in the antenna unit, that is, the MIMO technology may be implemented through the antenna unit provided by the embodiments of the present disclosure. In this way, the communication capacity and the communication speed of the antenna unit can be increased.

It should be noted that for the convenience of description and understanding, the two coupling body groups are divided into a first coupling body group and a second coupling body group in the following embodiment. Each of the first coupling body group and the second coupling body group includes two coupling bodies arranged symmetrically, and a symmetry axis of the first coupling body group is orthogonal to a symmetry axis of the second coupling body group.

Optionally, in the embodiments of the present disclosure, the first coupling body group and the second coupling group may be two coupling body groups with different polarizations. Specifically, the first coupling body group may be a coupling body group with a first polarization, and the second coupling body group may be a coupling body group with a second polarization.

In the embodiments of the present disclosure, the two coupling body groups may be two coupling body groups with different polarizations.

It should be noted that in the embodiments of the present disclosure, the polarization forms of the two coupling body groups may be any possible polarization forms. Specifically, this may be determined based on an actual use requirement, and is not limited in the embodiments of the present disclosure.

Figure 4:
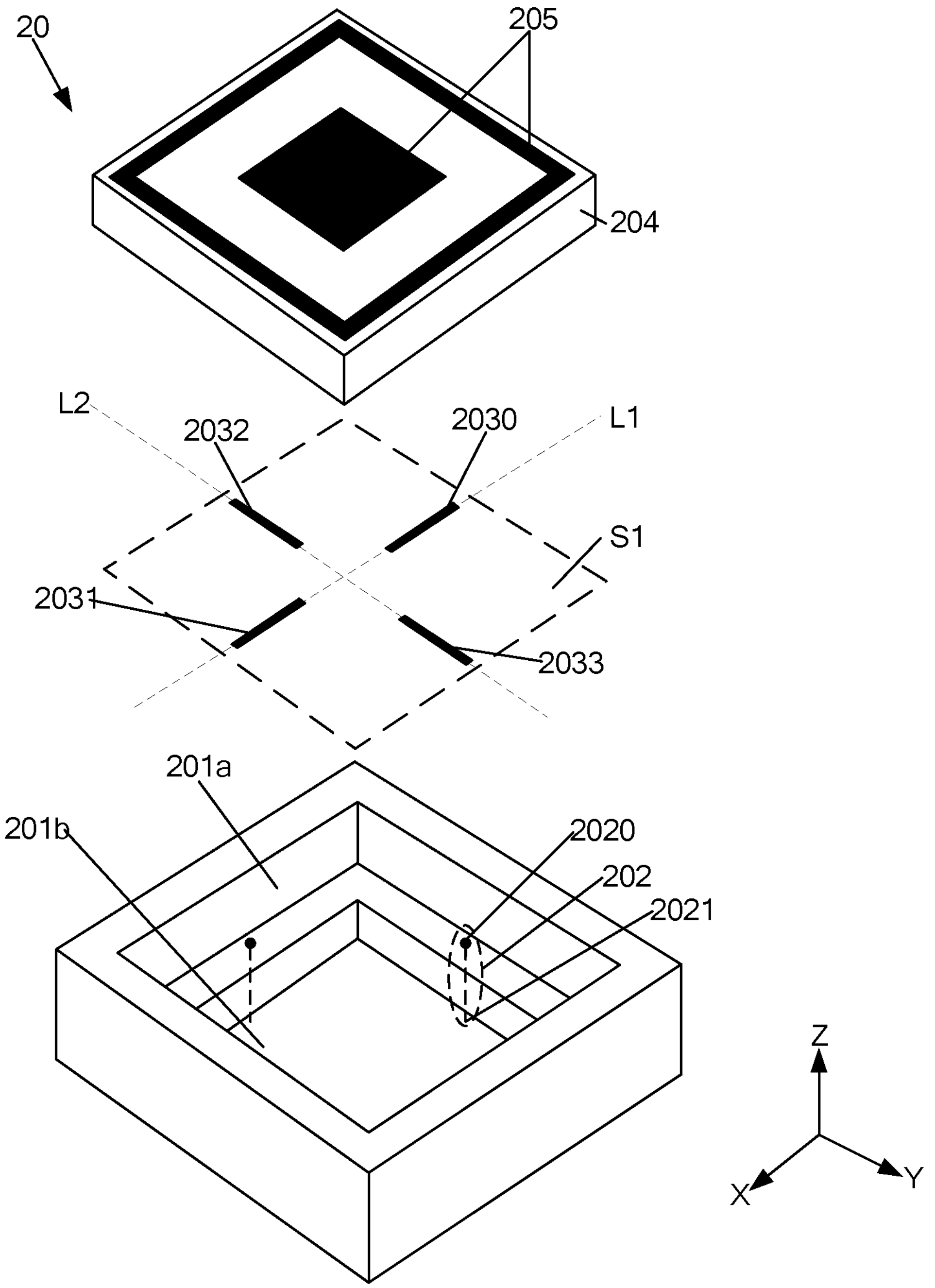
FIG. 4 is a third exploded view of an antenna unit according to an embodiment of the present disclosure.

Exemplarily, with reference to FIG. 3, as shown in FIG. 4, the first coupling body group may include a coupling body 2030 and a coupling body 2031, and the second coupling group may include a coupling body 2032 and a coupling body 2033. The first coupling body group formed by the coupling body 2030 and the coupling body 2031 may be a coupling body group with a first polarization (such as a coupling body group with a perpendicular polarization); and the second coupling body group formed by the coupling body 2032 and the coupling body 2033 may be a coupling body group with a second polarization (such as a coupling body group with a horizontal polarization).

Optionally, in the embodiments of the present disclosure, the two coupling body groups may be two coupling body groups with different polarizations, that is, the first polarization and the second polarization may be polarizations in different directions.

It should be noted that in the embodiments of the present disclosure, the polarization forms of the two coupling body groups may be any possible polarization forms. Specifically, this may be determined based on an actual use requirement, and is not limited in the embodiments of the present disclosure.

In the embodiments of the present disclosure, the first coupling body group and the second coupling body group may be two coupling body groups with different polarizations, so the antenna unit provided by the embodiments of the present disclosure may form a dual-polarized antenna unit. In this way, the communication disconnection probability of the antenna unit can be reduced, that is, the communication capability of the antenna unit can be improved.

Optionally, in the embodiments of the present disclosure, for the two coupling bodies in the first coupling body group, signal sources connected to two feed portions electrically connected to the two coupling bodies may have the same amplitude, and the signal sources connected to the two feed portions electrically connected to the two coupling bodies may have a phase difference being 180 degrees.

Correspondingly, for the two coupling bodies in the second coupling body group, signal sources connected to two feed portions electrically connected to the two coupling bodies may have the same amplitude, and the signal sources connected to the two feed portions electrically connected to the two coupling bodies may have a phase difference being 180 degrees.

In the embodiments of the present disclosure, when one coupling body in the first coupling body group is in a working state, the other coupling body in the first coupling body group may also be in a working state. Correspondingly, when one coupling body in the second coupling body group is in a working state, the other coupling body in the second coupling body group may also be in a working state. That is, the coupling bodies in the same coupling body group may work at the same time.

Optionally, in the embodiments of the present disclosure, when the coupling body in the first coupling body group is in a working state, the coupling body in the second coupling body group may be in a working state, or may also not be in a working state. Specifically, this may be determined based on an actual use requirement, and is not limited in the embodiments of the present disclosure.

In the embodiments of the present disclosure, the first coupling body group and the second coupling body group are distributed orthogonally, the signal sources connected to the two feed portions electrically connected to the two coupling bodies in the same coupling body group have the same amplitude, and the signal sources connected to the two feed portions electrically connected to the two coupling bodies in the same coupling body group have a phase difference being 180 degrees, that is, the feed mode adopted by the antenna unit provided by the embodiments of the present disclosure is a differential orthogonal feed mode, so the communication capacity and the communication speed of the antenna unit can be further increased.

Optionally, in the embodiments of the present disclosure, the above two coupling body groups may be located on the same plane, and the coupling bodies in the any coupling body group may be distributed on the symmetry axis of the other coupling body group.

Exemplarily, as shown in FIG. 4, the first coupling body group and the second coupling body group are both located on a first plane S1, that is, the coupling body 2030 and the coupling body 2031 in the first coupling body group are located on the first plane S1, and the coupling body 2032 and the coupling body 2033 in the second coupling body group are located on the first plane S1. Moreover, as shown in FIG. 4, the coupling body 2030 and the coupling body 2031 in the first coupling body are located on the symmetry axis L1 (that is, a first symmetry axis) of the second coupling body group, and the coupling body 2032 and the coupling body 2033 in the second coupling body group are located on the symmetry axis L2 (that is, a second symmetry axis) of the first coupling body group.

In the embodiments of the present disclosure, in a case that a distance between each of the M coupling bodies and the radiating body (such as the at least two radiating bodies or the target metal groove) is equal, the coupling parameter of the M coupling bodies and the radiating body can be controlled conveniently, for example, the induced current generated in the coupling process, so the two coupling body groups may be arranged on the same plane; moreover, the coupling body in any coupling body group is arranged on the symmetry axis of the other coupling body group, so that the distance between different coupling bodies and the radiating body may be equal, and the working state of the antenna unit provided by the embodiments of the present disclosure can be controlled conveniently.

Optionally, in the embodiments of the present disclosure, the shape of the first insulator may be as same as the shape of the opening of the target metal groove, such as a cuboid, a cylinder or any possible shapes.

It should be noted that in the embodiments of the present disclosure, the shape of the first insulator may be any shape capable of meeting the actual use requirement, which is not specifically limited in the embodiments of the present disclosure and may be determined specifically according to an actual use requirement.

Optionally, in the embodiments of the present disclosure, a material of the first insulator may be an insulating material with a small relative dielectric constant and a small tangent value of loss angle.

Optionally, in the embodiments of the present disclosure, the material of the first insulator may be plastic, foam or any possible materials. Specifically, this may be determined based on an actual use requirement, and is not limited in the embodiments of the present disclosure.

Exemplarily, in the embodiments of the present disclosure, the relative dielectric constant of the material of the first insulator may be 2.2, and the tangent value of loss angle may be 0.0009.

In the embodiments of the present disclosure, the first insulator not only can bear the at least two radiating bodies, but also can isolate the at least two radiating bodies and the M coupling bodies, so that interference between the at least two radiating bodies and the M coupling bodies can be avoided.

It should be noted that in the embodiments of the present disclosure, on the premise of bearing the at least two radiating bodies, the smaller the relative dielectric constant and the tangent value of loss angle of the material of the first insulator is, the less the influence on the radiation effect of the antenna unit by the first insulator is. That is, the smaller the relative dielectric constant and the tangent value of loss angle of the material of the first insulator is, the less the influence on the working performance of the antenna unit by the first insulator is, and the better the radiation effect of the antenna unit is.

Optionally, in the embodiments of the present disclosure, the at least two radiating bodies may include a first radiating body and a second radiating body.

It may be understood that the first radiating body and the second radiating body are different radiating bodies, and a resonance frequency of the first radiating body is different from a resonance frequency of the second radiating body.

Optionally, in the embodiments of the present disclosure, the first radiating body may be a polygonal radiating body, and the second radiating body may be an annular radiating body.

Optionally, in the embodiments of the present disclosure, the annular radiating body may be a rectangular annular radiating body, a square annular radiating body, or an annular radiating body with any possible shapes. The polygonal radiating body may be a rectangular v radiating body, a square polygonal radiating body, or any possible polygonal radiating bodies. Specifically, this may be determined based on an actual use requirement, and is not limited in the embodiments of the present disclosure.

Optionally, in the embodiments of the present disclosure, the annular radiating body may be a closed annular radiating body, that is, each side of the annular radiating body is connected sequentially; and the annular radiating body may also be a semi-closed annular body, that is, sides of the annular radiating body are partially continuous. Specifically, this may be determined based on an actual use requirement, and is not limited in the embodiments of the present disclosure.

Optionally, in the embodiments of the present disclosure, the area of the at least two radiating bodies may be greater the area of the first radiating body.

Optionally, in the embodiments of the present disclosure, the first radiating body (that is, the polygonal radiating body) may be located in the middle of the second radiating body (that is, the annular radiating body).

Certainly, in actual implementation, the shape of the first radiating body and the shape of the second radiating body may be any possible shapes, which may be determined according to an actual use requirement and is not limited in the embodiments of the present disclosure.

In the embodiments of the present disclosure, due to that different radiating bodies have different resonance frequencies, so when the first radiating body, the second radiating body and the target metal groove are different radiating bodies, and the first radiating body, the second radiating body and the target metal groove are located at different positions of the antenna unit, the first radiating body, the second radiating body and the target metal groove may be coupled with the M coupling bodies to generate electromagnetic waves with different frequencies. In this way, the antenna unit can cover different frequency bands, that is, the frequency bands increased by the antenna unit can be increased, and the performance of the antenna unit can be improved.

Optionally, in the embodiments of the present disclosure, the, the resonance frequency of the first radiating body may be a first frequency, the resonance frequency of the second radiating body may be a second frequency, and the resonance frequency of the target metal groove may be a third frequency.

The first frequency may be greater than the second frequency, and the second frequency may be greater than the third frequency.

In the embodiments of the present disclosure, different radiating bodies have different resonance frequencies, so the resonance frequencies of the first radiating body, the second radiating body and the target metal groove may be different frequencies.

Optionally, in the embodiments of the present disclosure, the first frequency may belong to a first frequency range, the second frequency may belong to a second frequency range, and the third frequency may belong to a third frequency range.

The first frequency range may be 37 GHz-43 GHz, the second frequency range may be 27 GHz-30 GHz, and the third frequency range may be 24 GHz-27 GHz.

Figure 5:
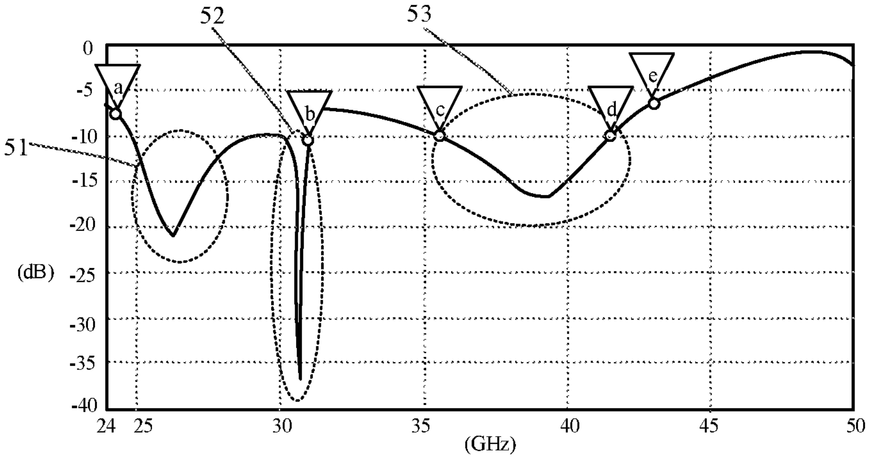
FIG. 5 is a reflection coefficient diagram of an antenna unit according to an embodiment of the present disclosure.

Exemplarily, it is assumed that the first radiating body is a polygonal radiating body and the second radiating body is an annular radiating body. As shown in FIG. 5, it is a reflection coefficient diagram of the antenna unit when the antenna unit provided by the embodiments of the present disclosure works. The frequency of the electromagnetic wave generated by coupling of the M coupling bodies and the target metal groove may belong to a frequency range indicated by 51 in FIG. 5, that is, the resonance frequency of the target metal groove belongs to the frequency range indicated by 51 in FIG. 5; the frequency of the electromagnetic wave generated by coupling of the M coupling bodies and the annular radiating body (namely the second radiating body) may belong to a frequency range indicated by 52 in FIG. 5, that is, the resonance frequency of the annular radiating body belongs to the frequency range indicated by 52 in FIG. 5; and the frequency of the electromagnetic wave generated by coupling of the M coupling bodies and the polygonal radiating body (namely the first radiating body) may belong to a frequency range indicated by 53 in FIG. 5, that is, the resonance frequency of the polygonal radiating body belongs to the frequency range indicated by 53 in FIG. 5. Furthermore, it can be seen from FIG. 5 that the coupling of the coupling body and the target metal groove may generate low-frequency electromagnetic wave, and the coupling of the coupling body and the first radiating body may generate electromagnetic wave with a frequency close to low frequency, so that the antenna unit provided by the embodiments of the present disclosure may cover the frequency range of 24.25 GHz-29.5 GHz (such as n257, n258 and n261), and the low-frequency bandwidth of the antenna unit can be enlarged; and the coupling of the coupling body and the second radiating body may generate high-frequency electromagnetic wave, so that the antenna unit provided by the embodiments of the present disclosure may cover the frequency range of 37 GHz-43 GHz (such as n259 ad n260).

In summary, the antenna unit provided by the embodiments of the present disclosure may cover most of 5G millimeter wave frequency bands (for example, 5G millimeter wave frequency bands that have been planned, such as n257, n258, n259, n260 and n261), so that the antenna performance of the terminal device can be improved.

It should be noted that the points a, b, c, d and e in FIG. 5 are used to mark values of return loss. It may be seen from FIG. 5 that the values of return loss marked by the points a, b, c, d and e are all less than −6 dB. That is, the antenna unit provided by the embodiments of the present disclosure may meet the actual use requirement.

Optionally, in the embodiments of the present disclosure, the antenna unit may further include a second insulator arranged between the bottom of the first metal groove and the first insulator, and the M coupling bodies may be borne on the second insulator.

Figure 6:
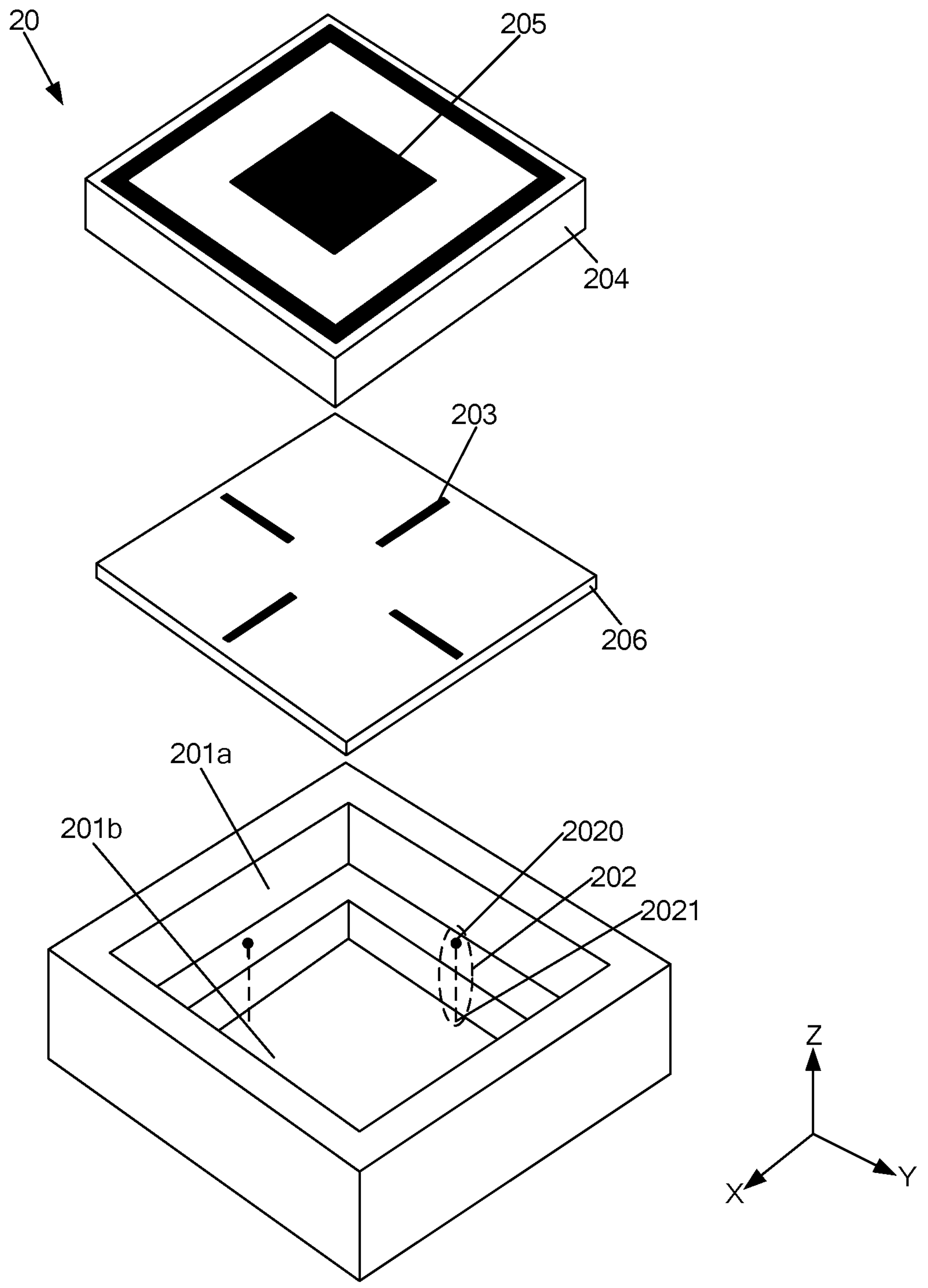
FIG. 6 is a fourth exploded view of an antenna unit according to an embodiment of the present disclosure.

Exemplarily, with reference to FIG. 3, as shown in FIG. 6, the antenna unit 20 may further include a second insulator 206 arranged between the bottom of the first metal groove 201*a* and the first insulator 204. The M coupling bodies 203 are borne on the second insulator 206.

In the embodiments of the present disclosure, the second insulator not only can bear the M coupling bodies, but also can isolate the M coupling bodies and the second metal groove, so that interference between the M coupling bodies and the second metal groove can be avoided.

Optionally, in the embodiments of the present disclosure, the shape of the second insulator may be as same as the shape of the opening of the target metal groove, such as a cuboid, a cylinder or any possible shapes.

Optionally, in the embodiments of the present disclosure, a material of the second insulator may be an insulating material with a small relative dielectric constant and a small tangent value of loss angle.

Optionally, in the embodiments of the present disclosure, the material of the second insulator may be as same as the material of the first insulator.

Optionally, in the embodiments of the present disclosure, the material of the second insulator may be plastic, foam or any possible materials. Specifically, this may be determined based on an actual use requirement, and is not limited in the embodiments of the present disclosure.

Exemplarily, in the embodiments of the present disclosure, the relative dielectric constant of the material of the second insulator may be 2.5, and the tangent value of loss angle may be 0.001.

It should be noted that in the embodiments of the present disclosure, the shape of the second insulator may be any shape capable of meeting the actual use requirement, which is not specifically limited in the embodiments of the present disclosure and may be determined specifically according to an actual use requirement.

It should be noted that in the embodiments of the present disclosure, on the premise of bearing the M coupling bodies, the smaller the relative dielectric constant and the tangent value of loss angle of the material of the second insulator is, the less the influence on the radiation effect of the antenna unit by the second insulator is. That is, the smaller the relative dielectric constant and the tangent value of loss angle of the material of the second insulator is, the less the influence on the working performance of the antenna unit by the second insulator is, and the better the radiation effect of the antenna unit is.

Optionally, in the embodiments of the present disclosure, at least one radiating body of the at least two radiating bodies is flush with a surface where an opening of the target metal groove is located.

It may be understood that in the embodiments of the present disclosure, the at least two radiating bodies may be flush with the surface where the opening of the target metal groove is located; or part of the at least two radiating bodies may be flush with the surface where the opening of the target metal groove is located; or one of the at least two radiating bodies may be flush with the surface where the opening of the target metal groove is located. Specifically, this may be determined based on an actual use requirement, and is not limited in the embodiments of the present disclosure.

Optionally, in the embodiments of the present disclosure, when the target metal groove includes a first metal groove and a second metal groove, at least one radiating body of the at least two radiating bodies may be flush with a surface where an opening of the first metal groove is located.

Figure 7:
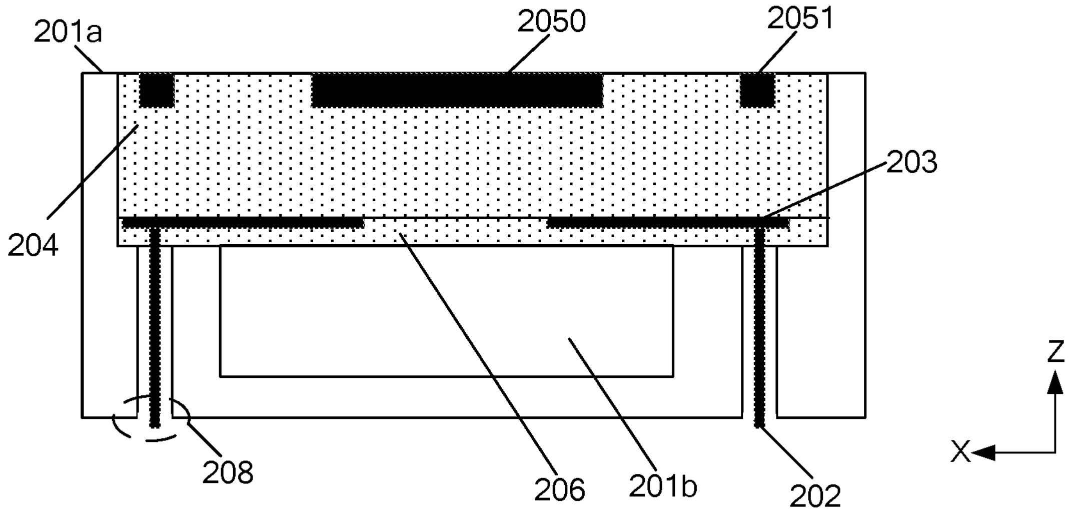
FIG. 7 is a first sectional view of an antenna unit according to an embodiment of the present disclosure.
Figure 8:
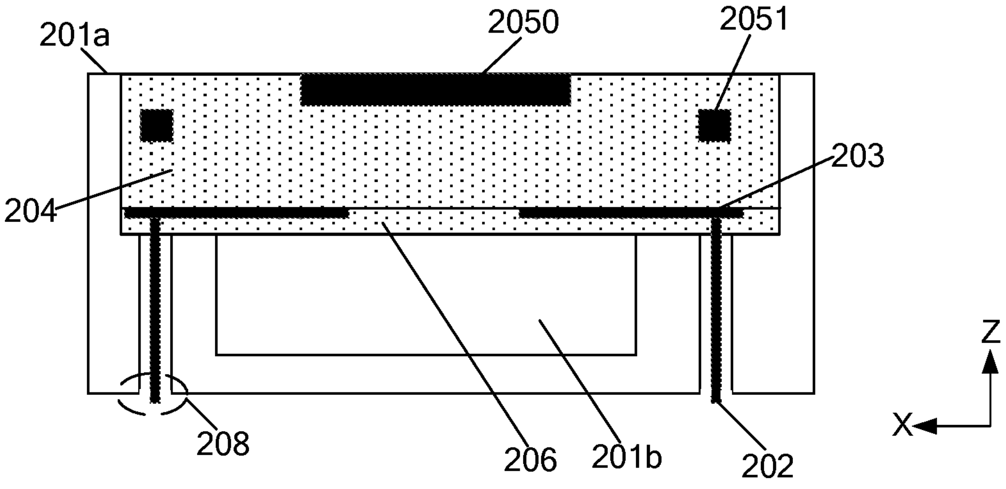
FIG. 8 is a second sectional view of an antenna unit according to an embodiment of the present disclosure.

Exemplarily, it is assumed that the at least two radiating bodies are two radiating bodies, namely a first radiating body and a second radiating body. As shown in FIG. 7, the first radiating body 2050 and the second radiating body 2051 are flush with the surface where the opening of the first metal groove 201*a* is located; and as shown in FIG. 8, the first radiating body 2050 is flush with the surface where the opening of the first metal groove 201*a* is located, and the second radiating body 2051 is not flush with the surface where the opening of the first metal groove 201*a* is located.

It should be noted that as shown in FIG. 7 (or FIG. 8), the first radiating body 2050 and the second radiating body 2051 are borne on the first insulator 204, the M coupling bodies are borne on the second insulator 206, and the second insulator 206 is located between the first insulator 204 and the bottom of the first metal groove 201*a*; and the feed portion 202 is arranged at the bottom of the first metal groove 201*a* and penetrates through the bottom of the first metal groove 201*a*, and the feed portion 202 penetrates through the second insulator 206 and is electrically connected to the coupling body 203.

Certainly, in actual implementation, the at least two radiating bodies may also be located at any possible positions in the target metal groove, which may be specifically determined according to an actual use requirement and is not limited in the embodiments of the present disclosure.

In the embodiments of the present disclosure, the positions where the radiating bodies are located are different and the performance of the antenna unit may also be different, so the positions of the at least two radiating bodies may be arranged according to an actual use requirement, and the design of the antenna unit may be more flexible.

Optionally, in the embodiments of the present disclosure, the antenna unit may further include a metal protrusion arranged at the bottom of the second metal groove.

Optionally, in the embodiments of the present disclosure, the metal protrusion may be arranged in the center of the bottom of the second metal groove.

Certainly, in actual implementation, the metal protrusion may also be arranged at any possible position of the antenna unit, which may be specifically determined according to an actual use requirement and is not limited in the embodiments of the present disclosure.

Figure 9:
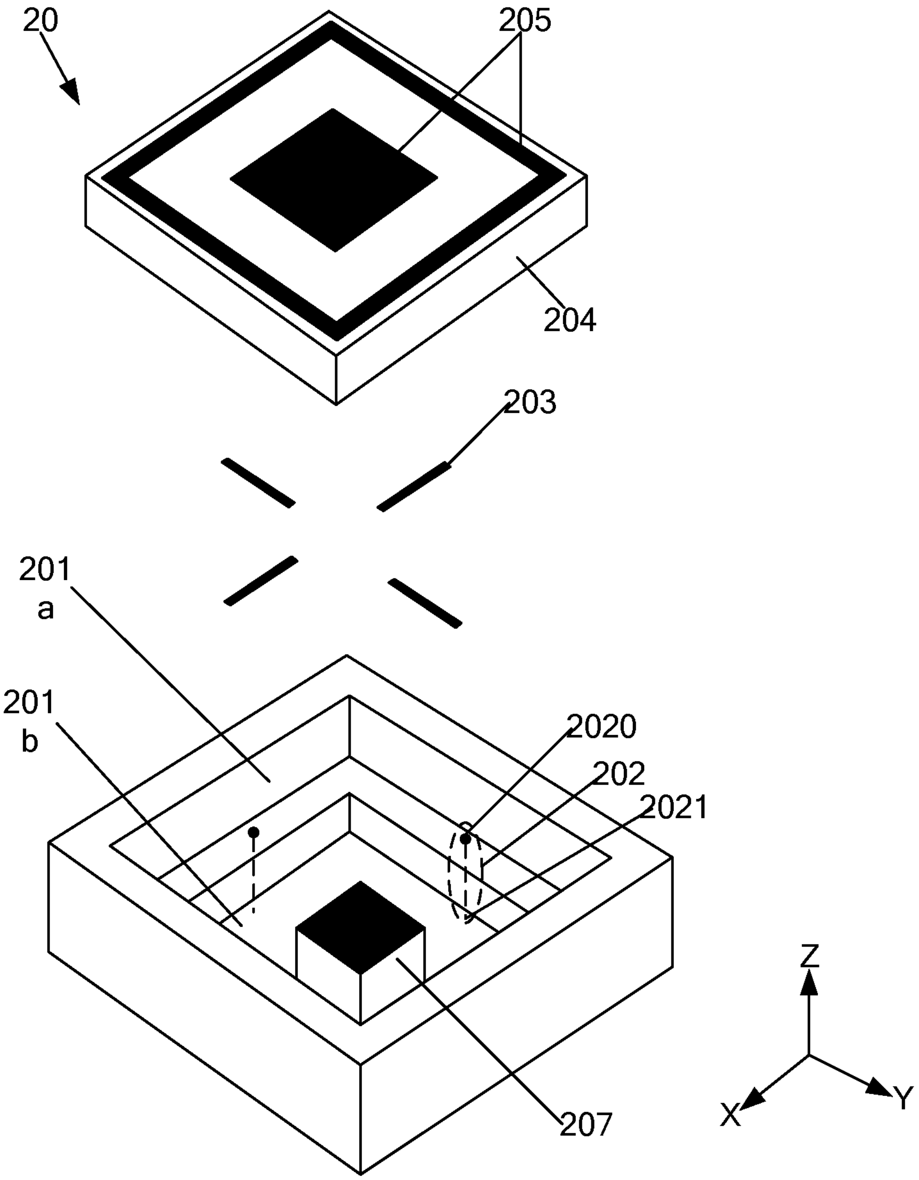
FIG. 9 is a fifth exploded view of an antenna unit according to an embodiment of the present disclosure.

Exemplarily, with reference to FIG. 3, as shown in FIG. 9, the antenna unit 20 may further include a metal protrusion 207 arranged at the bottom of the second metal groove 201*b*.

In the embodiments of the present disclosure, the metal protrusion may be used to adjust the impedance of the antenna unit so as to adjust the frequency of the electromagnetic wave generated by the coupling of the M coupling bodies, the at least two radiating bodies and the second metal groove.

Optionally, in the embodiments of the present disclosure, a shape of the metal protrusion may be a cuboid, a cube or a cylinder.

Certainly, in actual implementation, the shape of the metal protrusion may be any other possible shapes, which is not limited in the embodiments of the present disclosure.

The antenna unit provided by the embodiments of the present disclosure will be further exemplarily described with reference to FIG. 10.

Figure 10:
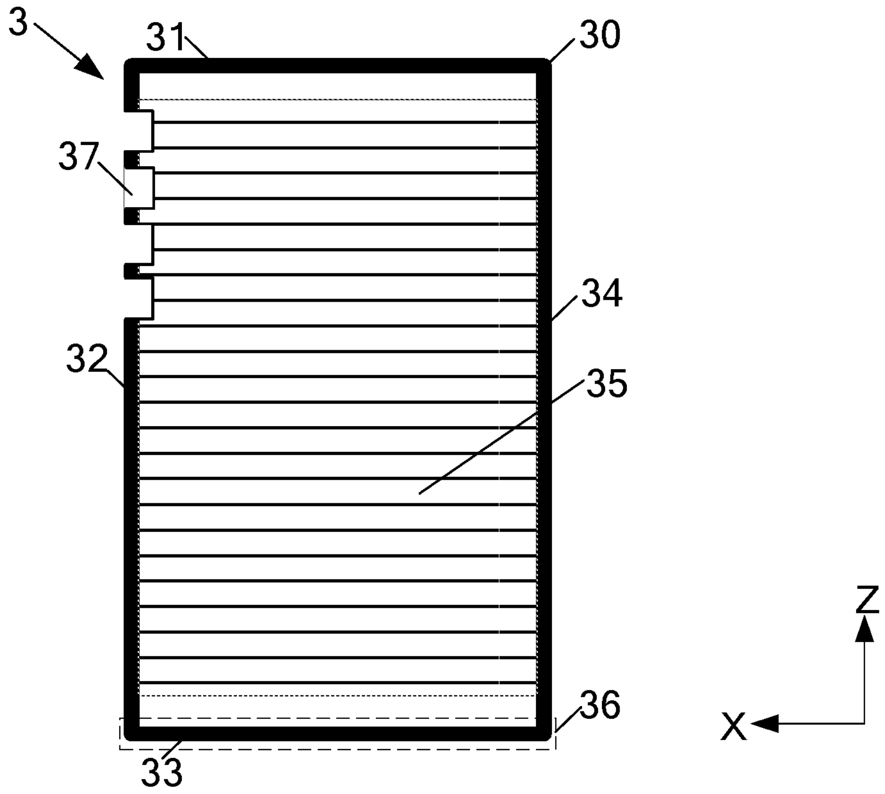
FIG. 10 is a top view of an antenna unit according to an embodiment of the present disclosure.

Exemplarily, as shown in FIG. 10, it is a top view of the antenna unit provided by the embodiments of the present disclosure in a forward direction of a Z axis (the coordinate system shown in FIG. 3). The first insulator 204 is located in the first metal groove 201*a* (it may be understood that the first metal groove 201*a* surrounds the first insulator 204); and the first insulator 204 bears the first radiating body 2050 and the second radiating body 2051, and the first radiating body 2050 and the second radiating body 2051 are both flush with the surface where the opening of the first metal groove 201*a* is located. Four coupling bodies (namely, a coupling body 2030, a coupling body 2031, a coupling body 2032 and a coupling body 2033) are arranged between the first insulator 204 and the bottom of the first metal groove 201*a*; and a metal protrusion 207 is arranged at the bottom of the second metal groove (not shown in FIG. 10). Specifically, the four coupling bodies overlap with the first radiating body 2050 and the second radiating body 2051 in the Z axis direction, so the four coupling bodies may be coupled with the first radiating body 2050 and the second radiating body 2051; and since the four coupling bodies do not overlap with the metal protrusion 207 in the Z axis direction, the coupling of the metal protrusion 207 and the four coupling bodies may be avoided, so that the metal protrusion 207 can adjust the impedance of the antenna unit, and the frequency range covered by the antenna unit can be adjusted.

It should be noted that the coupling body and the metal protrusion are invisible when the antenna unit provided by the embodiments of the present disclosure is viewed from the reverse direction of the Z axis, so in order to accurately illustrate the relationship among various parts, the coupling bodies (including the coupling body 2030, the coupling body 2031, the coupling body 2032 and the coupling body 2033) and the metal protrusion 207 in FIG. 10 are all illustrated by dotted lines.

In the embodiments of the present disclosure, since the frequency of the electromagnetic wave generated by the coupling of the at least two radiating bodies, the second metal groove and the M coupling bodies is associated with the impedance of the antenna unit, the metal protrusion may be arranged at the bottom of the second metal groove to adjust the impedance of the antenna unit, so that the frequency of the electromagnetic wave generated by the coupling of the at least two radiating bodies, the second metal groove and the M coupling bodies can be adjusted, and the frequency band covered by the antenna unit can be located at the 5G millimeter wave frequency band.

Optionally, in the embodiments of the present disclosure, the antenna unit may further include a third insulator arranged in the second metal groove, and the third insulator may surround the metal protrusion.

A difference value between a relative dielectric constant of the third insulator and a relative dielectric constant of the air may be in a preset range.

In the embodiments of the present disclosure, since the metal protrusion is arranged at the bottom of the second metal groove, the third insulator may be arranged in the second metal groove to isolate the second metal groove (such as the bottom and the side wall of the second metal groove) from the metal protrusion, so that mutual interference between the second metal groove and the metal protrusion can be avoided.

Optionally, in the embodiments of the present disclosure, the third insulator may be a foam material or a plastic material with the relative dielectric constant being 1 or close to 1 (namely the relative dielectric constant of the air). Specifically, this may be determined based on an actual use requirement, and is not limited in the embodiments of the present disclosure.

In the embodiments of the present disclosure, the preset range may be determined according to the performance of the antenna, which is not limited in the embodiments of the present disclosure.

Optionally, in the embodiments of the present disclosure, the above second metal groove may not be filled with any insulator. It may be understood that in a case that the second metal groove is not filled with any insulator, a medium filled in the second metal groove is air (the relative dielectric constant is 1).

In the embodiments of the present disclosure, the third insulator may isolate the second metal groove and the metal protrusion, so that the second metal groove and the metal protrusion are not interfered with each other, and the performance of the antenna unit is more stable.

Optionally, in the embodiments of the present disclosure, with reference to FIG. 7 or FIG. 8, M through holes 208 penetrating through the bottom of the first metal groove may be formed at the bottom of the first metal groove, and each feed portion 202 of the M feed portions is arranged in one through hole 208.

Optionally, in the embodiments of the present disclosure, the M through holes may be through holes with the same diameter.

Optionally, in the embodiments of the present disclosure, the M through holes may be distributed at the bottom of the first metal groove uniformly. The specific distribution manner may be determined according to the distribution manner of the M coupling bodies in the first metal groove, which is not limited in the embodiments of the present disclosure.

In the embodiments of the present disclosure, the through holes penetrating through the bottom of the first metal groove may be formed at the bottom of the first metal groove, and the M feed portions may be arranged in the through holes, so that the M feed portions are arranged at the bottom of the first metal groove and penetrate through the bottom of the first metal groove, and a process that the feed portion penetrates through the first metal groove may be simplified.

Optionally, in the embodiments of the present disclosure, a fourth insulator may be arranged in each through hole, and the fourth insulator may wrap the feed portion.

In the embodiments of the present disclosure, the fourth insulator wraps the feed portion, so that the feed portion can be fixed in the through hole.

In the embodiments of the present disclosure, the fourth insulator may be an insulating material with a small relative dielectric constant and a small tangent value of loss angle.

Exemplarily, the fourth insulator may be a foam material, a plastic material or any possible material.

In the embodiments of the present disclosure, on one hand, the diameter of the through hole may be greater than the diameter of the feed portion, so when the feed portion is arranged in the through hole, the feed portion may not be fixed in the through hole. Through the manner that the fourth insulator is arranged in the through hole and wraps the feed portion, the feed portion may be fixed in the through hole. On the other hand, since the first metal groove and the feed portion are both metal materials and may generate interference in the working process of the antenna unit, the feed portion and the first metal groove may be isolated through a manner of adding the fourth insulator in the through hole, so that the feed portion is insulated from the first metal groove, and the antenna performance of the terminal device is more stable.

It should be noted that in the embodiments of the present disclosure, the antenna unit shown in each of the foregoing accompanying drawings is exemplarily described by using an accompanying drawing in the embodiments of the present disclosure as an example. During specific implementation, the antenna unit shown in each of the foregoing accompanying drawings may be implemented in combination with any other accompanying drawings illustrated in the foregoing embodiments, and details are not described herein again.

The embodiments of the present disclosure provide a terminal device. The terminal device may include an antenna unit provided by any embodiment in FIG. 2 to FIG. 10. Specific description of the antenna unit may be referenced to related description of the antenna unit in the embodiments. Details are not described herein again.

The terminal device in the embodiments of the present disclosure may be a mobile terminal, or may also be a non-mobile terminal. For example, the mobile terminal may be a mobile phone, a tablet computer, a laptop computer, a palmtop computer, an in-vehicle terminal, a wearable device, a ultra-mobile personal computer (UMPC), a netbook, or a personal digital assistant (PDA). The non-mobile terminal may be a personal computer (PC) or a television (TV). This is not specifically limited in the embodiments of the present disclosure.

Optionally, in the embodiments of the present disclosure, at least one first groove may be formed in a shell of the terminal device, and each antenna unit may be arranged in one first groove.

In the embodiments of the present disclosure, at least one first groove may be formed in the shell of the terminal device, and the antenna unit provided by the embodiments of the present disclosure is arranged in the first groove, so that at least one antenna unit provided by the embodiments of the present disclosure is integrated in the terminal device.

Optionally, in the embodiments of the present disclosure, the first groove may be formed on a frame of the shell of the terminal device.

Figure 11:
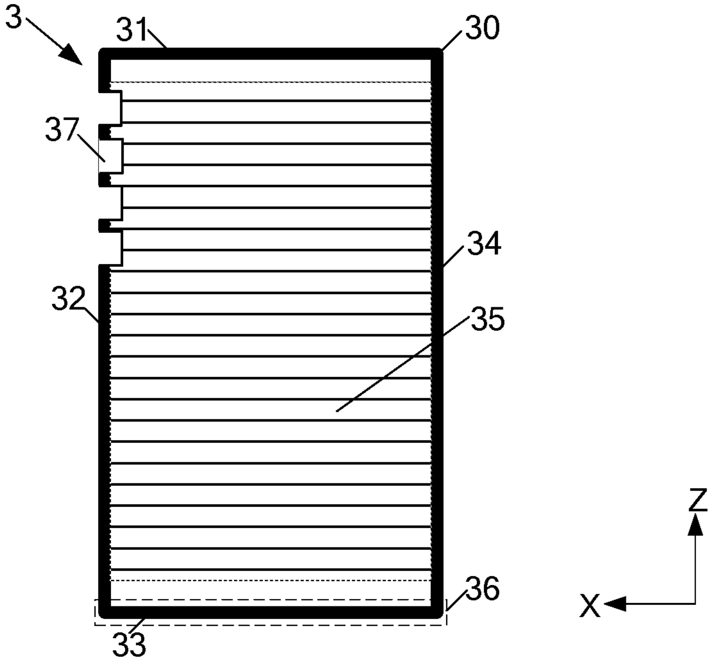
FIG. 11 is a first schematic diagram of a hardware structure of a terminal device according to an embodiment of the present disclosure.

In the embodiments of the present disclosure, as shown in FIG. 11, the terminal device 3 may include a shell 30. The shell 30 may include a first metal frame 31, a second metal frame 32 connected to the first metal frame 31, a third metal frame 33 connected to the second metal frame 32, and a fourth metal frame 34 connected to the third metal frame 33 and the first metal frame 31. The terminal device 3 may further include a floor 35 connected to the second metal frame 32 and the fourth metal frame 34, and a first antenna 36 (specifically, the first antenna may also be arranged in the metal frame) arranged in an area surrounded by the third metal frame 33, part of the second metal frame 32 and part of the fourth metal frame 34. The second metal 32 is provided with a first groove 37. In this way, the antenna unit provided by the embodiments of the present disclosure may be arranged in the first groove, so that the terminal device may include an array antenna module formed by the antenna unit provided by the embodiments of the present disclosure, and the design of integrating the antenna unit provided by the embodiments of the present disclosure in the terminal device can be implemented.

The floor may be a PCB or a metal middle frame in the terminal device, or may be any part capable of serving as a virtual ground, such as a display screen, in the terminal device.

It should be noted that in the embodiments of the present disclosure, the first antenna may be a communication antenna of a second generation mobile communication system (namely a 2G system), a third generation mobile communication system (namely a 3G system) and a fourth generation mobile communication system (namely a 4G system). The antenna unit integrated in the terminal device (the antenna unit formed by the groove structure and the target insulating layer located in the groove structure) may be an antenna of the 5G system of the terminal device.

Optionally, in the embodiments of the present disclosure, the first metal, the second metal frame, the third metal frame and the fourth metal frame may be sequentially connected end to end to form a closed frame; or part of the first metal, the second metal frame, the third metal frame and the fourth metal frame may be connected to a semi-closed frame; or the first metal, the second metal frame, the third metal frame and the fourth metal frame may not be connected mutually to form an open frame. Specifically, this may be determined based on an actual use requirement, and is not limited in the embodiments of the present disclosure.

It should be noted that the frame which the shell 30 shown in FIG. 11 includes is exemplarily described by taking the closed frame formed by sequentially connecting the first metal frame 31, the second metal frame 32, the third metal frame 33 and the fourth metal frame 34 end to end as an example, without any limitation to the embodiments of the present disclosure. For the frame formed by the first metal frame, the second metal frame, the third metal frame and the fourth metal frame in other connection manners (part of frames are connected or each frame is not connected mutually), the implementation manner is similar to the implementation manner provided in the embodiments of the present disclosure. To avoid repetition, details will not be elaborated herein.

Optionally, in the embodiments of the present disclosure, the at least one first groove may be formed on the same frame of the shell, or may also be formed in different frames. Specifically, this may be determined based on an actual use requirement, and is not limited in the embodiments of the present disclosure.

In the embodiments of the present disclosure, at least one first groove may be formed in the shell of the terminal device, and the antenna unit provided by the embodiments of the present disclosure is arranged in each first groove, so that at least one antenna unit provided by the embodiments of the present disclosure may be integrated in the terminal device, and the antenna performance of the terminal device can be improved.

Optionally, in the embodiments of the present disclosure, the target metal groove may be one part of the shell of the terminal device. It may be understood that the target metal groove may be a groove formed on the shell of the terminal device.

Figure 12:
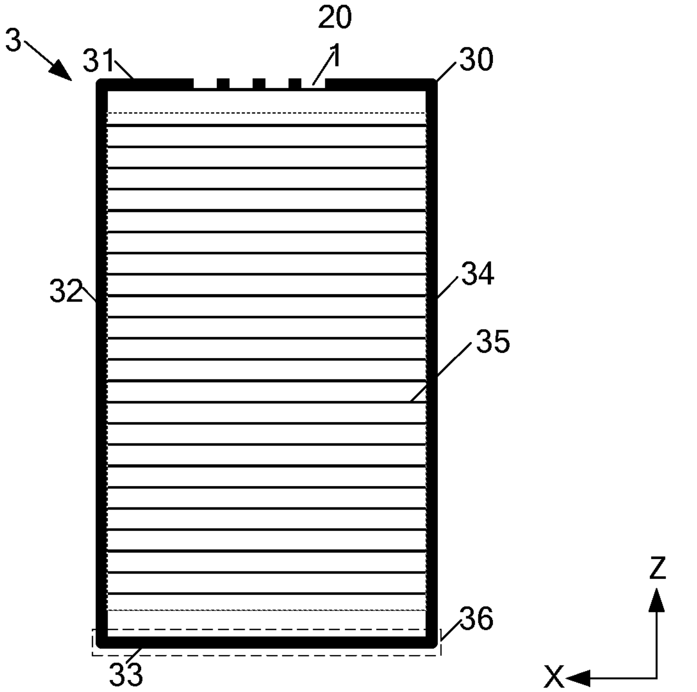
FIG. 12 is a second schematic diagram of a hardware structure of a terminal device according to an embodiment of the present disclosure.

Exemplarily, as shown in FIG. 12, at least one target metal groove 201 may be formed in the shell 30 of the terminal device 3 provided by the embodiments of the present disclosure, the first insulator, the M coupling bodies, the M feed portions and the at least two radiating bodies borne on the first insulator are all arranged in the target metal groove (actually, at the angle of the terminal device shown in FIG. 12, the target metal groove is invisible).

Optionally, in the embodiments of the present disclosure, one target metal groove may be formed in the first metal frame, the second metal frame, the third metal frame or the fourth metal frame of the shell. Specifically, this may be determined based on an actual use requirement, and is not limited in the embodiments of the present disclosure.

It may be understood that in a case that the target metal groove is arranged on the frame (such as the first metal frame) of the shell, the side wall of the target metal groove and the bottom of the target metal groove included in the target metal groove in the embodiments of the present disclosure are one part of the terminal device, which specifically may be one part of the frame of the shell provided by the embodiments of the present disclosure.

It should be noted that in the embodiments of the present disclosure, FIG. 12 is exemplarily described by taking the case where the target metal groove 201 is formed on the first metal frame 31 of the shell 30 and the opening direction of the target metal groove 201 is the forward direction of the Z axis of the coordinate system shown in FIG. 12 as an example.

It may be understood that in the embodiments of the present disclosure, as shown in FIG. 12, when the target metal groove is formed in the second metal frame of the shell, the opening direction of the target metal groove may be a forward direction of an X axis; when the target metal groove is formed on the third metal frame of the shell, the opening direction of the target metal groove may be a reverse direction of the Z axis; and when the target metal groove is formed on the fourth metal frame of the shell, the opening direction of the target metal groove may be a reverse direction of the X axis.

Optionally, in the embodiments of the present disclosure, the target metal groove may be formed in the shell of the terminal device, and a first insulator is arranged in each target metal groove, so that a plurality of antenna units provided by the embodiments of the present disclosure may be integrated in the terminal device, these antennae may form an antenna array, and the antenna performance of the terminal device can be improved.

Figure 13:
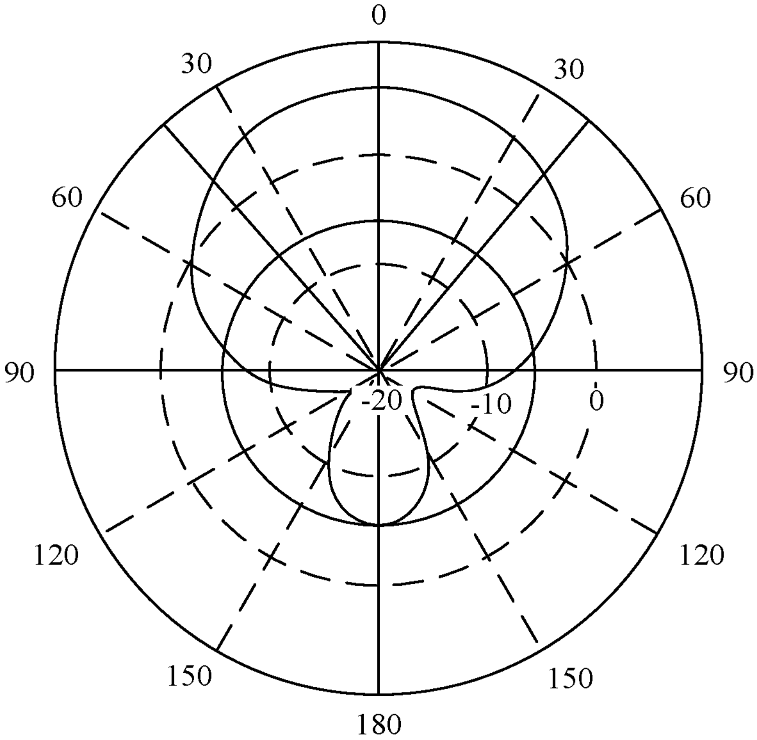
FIG. 13 is a first radiation direction diagram of an antenna unit according to an embodiment of the present disclosure.
Figure 14:
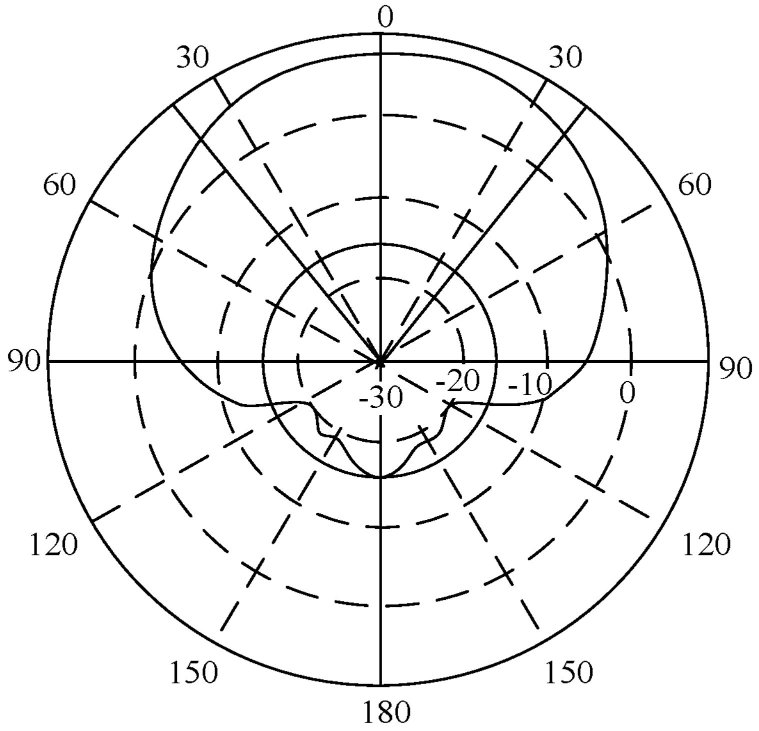
FIG. 14 is a second radiation direction diagram of an antenna unit according to an embodiment of the present disclosure.

In the embodiments of the present disclosure, as shown in FIG. 13, it is a radiation direction diagram of the antenna unit when the antenna unit provided by the embodiments of the present disclosure radiates a signal with the frequency of 28 GHz (that is, the antenna unit radiates a low-frequency signal); and as shown in FIG. 14, it is a radiation direction diagram of the antenna unit when the antenna unit provided by the embodiments of the present disclosure radiates a signal with the frequency of 39 GHz (that is, the antenna unit radiates a high-frequency signal). It can be seen from FIG. 13 and FIG. 14 that the maximum radiation direction when the high-frequency signal is radiated is as same as the maximum radiation direction when the low-frequency signal is radiated, so the antenna unit provided by the embodiments of the present disclosure is suitable for forming the antenna array. In this way, the terminal device may be provided with at least two first grooves, and one antenna unit provided by the embodiments of the present disclosure is arranged in each first groove, so that the terminal device may include an antenna array, and the antenna performance of the terminal device can be improved.

Optionally, in the embodiments of the present disclosure, in a case that a plurality of antenna units provided by the embodiments of the present disclosure are integrated in the terminal device, a distance between two adjacent antenna units (that is, a distance between two adjacent target metal grooves) may be determined according to the isolation degree of the antenna units and the scanning angle of the antenna array formed by the plurality of antenna units. Specifically, this may be determined based on an actual use requirement, and is not limited in the embodiments of the present disclosure.

Optionally, in the embodiments of the present disclosure, the number of the target metal groove arranged in the shell of the terminal device may be determined according to the size of the target metal groove structure and the size of the shell of the terminal device. The embodiment of the present disclosure is not limited to this.

Figure 15:
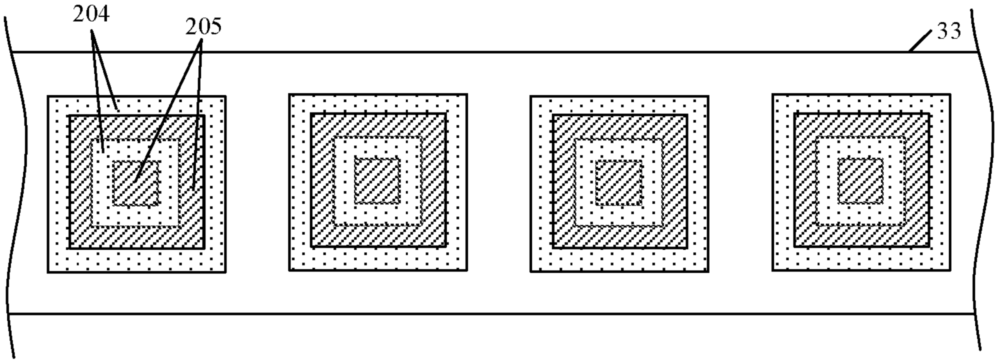
FIG. 15 is a bottom view of a terminal device according to an embodiment of the present disclosure.

Exemplarily, as shown in FIG. 15, it is a bottom view of the plurality of antenna units arranged on the shell provided by the embodiments of the present disclosure in a forward direction of the Z axis (the coordinate system shown in FIG. 12). As shown in FIG. 15, a plurality of antenna units (each antenna unit is formed by the target metal groove on the shell and the first insulator located in the target metal groove) provided by the embodiments of the present disclosure are arranged on the second metal frame 33. The first insulator 204 is arranged in the target metal groove (not shown in FIG. 15), and at least two radiating bodies 205 are borne in the first insulating layer 204.

It should be noted that in the embodiments of the present disclosure, FIG. 15 is only exemplarily described by taking the case where four antenna units are arranged on the third metal frame as an example, which does not form any limitation on the embodiments of the present disclosure. It may be understood that in actual implementation, the number of the antenna unit arranged on the third metal frame may be determined according to the actual use requirement, which is not limited by the embodiments of the present disclosure.

The embodiments of the present disclosure provide a terminal device. The terminal device may include an antenna unit. The antenna unit may include a target metal groove, M feed portions arranged at the bottom of the target metal groove, and M coupling bodies and a first insulator arranged in the target metal groove, wherein the M feed portions are insulated from the target metal groove, the M coupling bodies are located between the bottom of the target metal groove and the first insulator, each of the M feed portions is electrically connected to one coupling body, each of the M coupling bodies is coupled with the at least two radiating bodies and the target metal groove, different radiating bodies have different resonance frequencies, and M is a positive integer. By the solution, since the coupling bodies are coupled with the at least two radiating bodies and the target metal groove (may also serve as a radiating body), the coupling bodies may be coupled with the at least two radiating bodies and the target metal groove in a case that the coupling bodies receive an alternating current signal, so that the at least two radiating bodies and the target metal groove generate induced alternating current signals, and the at least two radiating bodies and the target metal groove generate electromagnetic wave with a certain frequency. Moreover, since different radiating bodies have different resonance frequencies, the electromagnetic waves generated by at least two radiating bodies and the target metal groove have different frequencies, so that the antenna unit can cover different frequency bands, that is, the frequency bands covered by the antenna unit can be increased, the antenna performance of the antenna unit can be improved, and the antenna performance of the terminal device can be improved.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

The invention claimed is:

1. An antenna unit, comprising a target metal groove, M feed portions arranged at the bottom of the target metal groove, M coupling bodies and a first insulator which are arranged in the target metal groove, and at least two radiating bodies borne by the first insulator, wherein the M feed portions are insulated from the target metal groove, the M coupling bodies are located between the bottom of the target metal groove and the first insulator, each of the M feed portions is electrically connected to one coupling body respectively, each of the M coupling bodies is coupled with the at least two radiating bodies and the target metal groove, different radiating bodies have different resonance frequencies, and M is a positive integer;

wherein the target metal groove comprises a first metal groove, and a second metal groove arranged at the bottom of the first metal groove; and the M feed portions are arranged at the bottom of the first metal groove, the M coupling bodies and the first insulator are arranged in the first metal groove, and each coupling body is coupled with the at least two radiating bodies and the second metal groove.

2. The antenna unit according to claim 1, wherein an opening of the first metal groove is larger than an opening of the second metal groove.

3. The antenna unit according to claim 1, wherein the M feed portions are arranged at the bottom of the first metal groove and penetrates through the bottom of the first metal groove.

4. The antenna unit according to claim 1, wherein the M coupling bodies are four coupling bodies, the four coupling bodies form two coupling body groups, each coupling body group comprises two coupling bodies arranged symmetrically, and a symmetry axis of one coupling body group is orthogonal to a symmetry axis of the other coupling body group; and a signal source connected to a first feed portion and a signal source connected to a second feed portion have the same amplitude and a phase difference of 180 degrees, and the first feed portion and the second feed portion are feed portions which are electrically connected to two coupling bodies in the same coupling body group respectively.

5. The antenna unit according to claim 4, wherein the two coupling body groups are located on the same plane, and the coupling bodies in the any coupling body group are distributed on the symmetry axis of the other coupling body group.

6. The antenna unit according to claim 1, wherein the at least two radiating bodies comprise a first radiating body and a second radiating body.

7. The antenna unit according to claim 6, wherein the first radiating body is a polygonal radiating body, and the second radiating body is an annular radiating body.

8. The antenna unit according to claim 6, wherein a resonance frequency of the first radiating body is a first frequency, a resonance frequency of the second radiating body is a second frequency, and a resonance frequency of the target metal groove is a third frequency; and the first frequency is greater than the second frequency, and the second frequency is greater than the third frequency.

9. The antenna unit according to claim 8, wherein the first frequency belongs to a first frequency range, the second frequency belongs to a second frequency range, and the third frequency belongs to a third frequency range; and the first frequency range is 37 GHz-43 GHz, the second frequency range is 27 GHz-30 GHz, and the third frequency range is 24 GHz-27 GHz.

10. The antenna unit according to claim 1, further comprising a second insulator arranged between the bottom of the first metal groove and the first insulator, wherein the M coupling bodies are borne on the second insulator.

11. The antenna unit according to claim 1, wherein at least one radiating body of the at least two radiating bodies is flush with a surface where an opening of the target metal groove is located.

12. The antenna unit according to claim 1 further comprising a metal protrusion arranged at the bottom of the second metal groove.

13. The antenna unit according to claim 12, further comprising a third insulator arranged in the second metal groove, wherein the third insulator surrounds the metal protrusion, and a difference value between a relative dielectric constant of the third insulator and a relative dielectric constant of the air is in a preset range.

14. A terminal device, comprising at least one of the antenna unit as defined in claim 1.

15. The terminal device according to claim 14, wherein at least one first groove is formed in a shell of the terminal device, and each antenna unit is arranged in one first groove.

16. The terminal device according to claim 14, wherein the target metal groove in the antenna unit is a part of the shell of the terminal device.

* * * * *